(12) United States Patent
Becker et al.

(10) Patent No.: US 10,566,805 B2
(45) Date of Patent: Feb. 18, 2020

(54) METHOD FOR CONTROLLING A TEMPERATURE OF A BATTERY CELL

(71) Applicant: Lithium Energy and Power GmbH & Co. KG, Stuttgart (DE)

(72) Inventors: Jens Becker, Benningen Am Neckar (DE); Michael Erden, Remseck (DE); Olivier Cois, Kernen (DE); Triantafyllos Zafiridis, Heilbronn (DE)

(73) Assignee: Lithium Energy and Power GmbH & Co. KG, Stuttgart (DE)

( * ) Notice: Subject to any disclaimer, the term of this patent is extended or adjusted under 35 U.S.C. 154(b) by 115 days.

(21) Appl. No.: 15/616,485

(22) Filed: Jun. 7, 2017

(65) Prior Publication Data
US 2017/0358933 A1 Dec. 14, 2017

(30) Foreign Application Priority Data

Jun. 8, 2016 (EP) ..................... 16173504
Jun. 2, 2017 (EP) ..................... 17174167

(51) Int. Cl.
*H02J 7/16* (2006.01)
*H02J 7/00* (2006.01)
(Continued)

(52) U.S. Cl.
CPC ......... *H02J 7/0021* (2013.01); *H01M 10/443* (2013.01); *H01M 10/486* (2013.01);
(Continued)

(58) Field of Classification Search
USPC .................................. 320/151–154
See application file for complete search history.

(56) References Cited

U.S. PATENT DOCUMENTS 6,076,964 A * 6/2000 Wu .................... G01K 7/42
374/134
6,204,639 B1 * 3/2001 Takano ............... H02J 7/0003
320/150

(Continued)

FOREIGN PATENT DOCUMENTS

DE 102013000220 4/2014

OTHER PUBLICATIONS

Ki-Yong Oh et al: "A novel thermal swelling model for rechargeable lithium-ion battery cell", Journal of Power Sources, vol. 303, Nov. 8, 2015, pp. 86-96.

*Primary Examiner* — Samuel Berhanu
(74) *Attorney, Agent, or Firm* — Michael Best & Friedrich LLP (57) ABSTRACT

A method for controlling a temperature of a battery cell (22, 24) in a battery module (20), the method comprising the steps of: determining an initial temperature of the battery cell (22, 24); measuring a current (I) flowing into or out of the battery cell (22, 24); determining an actual temperature gradient of the battery cell (22, 24) using a thermal battery cell model described by a differential equation, for which input values comprise at least the determined initial temperature and the measured current (I); comparing the determined actual temperature gradient of the battery cell (22, 24) with a pre-defined desired temperature gradient; and automatically adjusting the current (I) flowing into or out of the battery cell (22, 24) according to a result of the comparison.

12 Claims, 5 Drawing Sheets

(51) Int. Cl.
*H01M 10/625* (2014.01)
*H01M 10/633* (2014.01)
*H01M 10/635* (2014.01)
*H01M 10/44* (2006.01)
*H01M 10/48* (2006.01)

(52) U.S. Cl.
CPC ....... *H01M 10/625* (2015.04); *H01M 10/633* (2015.04); *H01M 10/635* (2015.04); *H02J 7/007* (2013.01); *H01M 2220/20* (2013.01); *H02J 2007/0096* (2013.01)

(56) References Cited

U.S. PATENT DOCUMENTS

| | | | |
|---|---|---|---|
| 6,271,643 B1 | 8/2001 | Becker et al. | |
| 2004/0135553 A1* | 7/2004 | Sakakibara | H01M 10/46 320/150 |
| 2009/0153104 A1* | 6/2009 | Matsuura | H02J 7/0091 320/153 |
| 2013/0221925 A1* | 8/2013 | Nishida | H02J 7/0063 320/118 |
| 2014/0095092 A1 | 4/2014 | Ikeda et al. | |
| 2014/0210481 A1* | 7/2014 | Buford | G01R 31/3606 324/431 |
| 2014/0377605 A1 | 12/2014 | Debert et al. | |

* cited by examiner

METHOD FOR CONTROLLING A TEMPERATURE OF A BATTERY CELL

BACKGROUND OF THE INVENTION

The present invention relates to a method and a device for controlling a temperature of a battery cell, and in particular to a method and a device for controlling a temperature in a battery cell which is part of a battery module which may be used in a vehicle.

It is common in batteries of prior art that a temperature is measured module by module, that is for individual modules of the battery. This is done assuming that temperatures of individual battery cells, of which the battery module is constituted, only differ insignificantly from the temperature determined for the battery module. Accordingly, multiple temperature sensors in battery modules of the prior art are mounted for example on battery cell connectors which connect the battery cells in a battery module.

Controlling of operating parameters of the battery cells, for example controlling an overall battery output power, to not exceed a pre-defined maximum battery temperature is not part of batteries according to prior art implementations. Since temperature gradients have not been regarded by prior art devices, thermal stress occurring due to irregular distribution of thermal gradients in a battery pack were not possible to be successfully prevented.

SUMMARY OF THE INVENTION

A method for controlling a temperature of a battery cell in a battery module is disclosed, wherein the method comprises the steps of: determining an initial temperature of the battery cell; measuring a current flowing into or out of the battery cell; determining an actual temperature gradient of the battery cell using a thermal battery cell model; comparing the determined temperature gradient of the battery cell with a pre-defined temperature gradient; and automatically adjusting the current flowing into or out of the battery cell according to a result of the comparison.

In an aspect of the present invention the thermal battery cell model is described by a differential equation. Input values to the differential equation preferably comprise at least the determined initial temperature and the measured current flowing into or out of the battery cell during operation. Additionally constant input values like geometrical parameters of the battery cell and/or thermal parameters of the battery cell and variable input values like temperature values of surroundings of the battery cell and the like may be used with the thermal battery cell model in preferred embodiments.

In an aspect of the present invention a single temperature sensor may be used to determine an initial temperature as well as to provide an actual temperature, based on which an actual temperature gradient of the battery module during operation can be estimated.

Further disclosed is a temperature controlling device of a battery cell in a battery module, wherein the device comprises a memory device, a sensor unit and a control unit. The memory device is used for storing a pre-defined thermal battery cell model which is described by a differential equation. Also stored in the memory device are constant parameters of the battery cell to be used together with the thermal battery cell model. The sensor unit is used to determine variable parameters of the battery cell and its environment to be used together with the thermal battery cell model. The parameters to be determined comprise at least a current flowing into or out of the battery cell and a temperature inside the battery module. The control unit is used to perform operations using the parameters read from the memory device and/or determined by the sensor unit and automatically adjust operating parameters of the battery cell based on those operations. The operating parameters of the battery cell to be adjusted comprise at least a current flowing into or out of the battery cell. The control unit is preferably configured to determine an actual temperature gradient of the battery cell using the stored thermal battery cell model, to compare the determined temperature gradient with a pre-defined desired temperature gradient stored in the memory device, and to automatically adjust a current flowing into or out of the battery cell based on the result of the comparison.

The constant input values to the thermal battery cell model to be stored in the memory device may comprise, for example, area values of battery cell side surfaces, heat transfer coefficients for the different side surfaces of the battery cell, a mass and a specific heat capacity of the battery cell and the like.

The thermal battery cell model further comprises mechanical information from which a thermal stress resistance of the battery cell and/or the battery module in connection with an actual temperature gradient can be derived. For example the model may reflect a variation of shape of the cells and/or a housing depending on thermal stress and/or a temperature gradient. If corresponding information on the materials of the battery cell and/or the battery module are available (e.g. from a data storage), a predefined admissible deformation can be used in order to ensure that the corresponding admissible thermal stress is not exceeded. It goes without saying that the admissible thermal stress may alternatively be represented in the data storage without a definition of the predefined admissible deformation. Thus, the temperature gradient of the battery cell and/or the battery module can be controlled by adapting e.g. the current through the battery cell or the battery module, respectively. Thus inhomogeneous charging of battery cells due to large temperature gradients can be prevented. The present invention further facilitates preventing inhomogeneous heat in battery cells which are connected in parallel to each other due to different temperature gradients.

In a preferred embodiment of the present invention the initial temperature is determined by means of a temperature sensor in the battery module at a pre-defined point in time and/or under a predefined condition. To determine the initial temperature of the battery cell, for example, a specific condition or point in time may be used for which it is sufficiently accurate to assume that the temperatures of all battery cells in a battery module are the same. Therefore it may be sufficient to just use one single temperature sensor disposed at a suitable location inside the battery module (e.g. on a battery cell connector) to determine the temperature inside the battery module and assign this temperature as the initial temperature to each individual battery cell.

According to another aspect of the present invention the method further comprises determining, for example from a measured current, whether the battery cell is in an idle state. The battery cell may be defined to be in an idle state, for example, if no current has flown into or out of the battery cell for a certain predefined amount of time. In this case, measuring the amount of time for which the battery cell remains in the idle state may be part of the method according to a preferred embodiment. The method may further comprise determining, after a pre-defined amount of time has passed with the battery cell remaining in the idle state that the battery cell has reached the point in time and/or the pre-defined condition to allow measuring the initial temperature to be used for each of the battery cells.

In another preferred embodiment the method further comprises determining, that the actual temperature gradient for each of the battery cells is within a predefined range, in particular equal to the predefined desired temperature gradient. The predefined range (or window) for a temperature gradient may be chosen depending on specific operational modes the battery cell is used in (e.g. a driving state of a vehicle drive train powered by said battery module).

In yet another preferred embodiment in addition to measuring the temperature inside the battery module by means of an internal temperature sensor the method may further comprise measuring by means of an external temperature sensor an ambient temperature around the battery module to be used as another variable input value for the thermal battery cell model.

The method according to the present invention preferably further comprises determining an operational mode of the battery cell, for example a charging or discharging mode, and determining the predefined desired temperature gradient during the determined mode of operation. The parameters to be used with the thermal model which correspond to the respective determined mode of operation may be stored as respective sets of data in the memory device of the temperature controlling device according to a preferred embodiment.

It is further preferred that the method according to the present invention, further comprises: storing of data sets for sequences of charging-/discharging modes and/or corresponding pre-defined desired temperature gradients and/or corresponding pre-defined desired durations, for which a certain stored temperature value is to be maintained in the corresponding charging-/discharging mode. Such a sequence of charging-/discharging modes could be for example an initial idle state, followed by a quick-start state, in which it is allowed to draw a high amount of current from the battery cell for a certain amount of time and/or until a certain maximum temperature or temperature gradient of the battery cell is reached, followed by a relaxed operational state, during which the battery cell temperature is supposed to be brought down to a new lower maximum temperature value, thus less current is allowed to be drawn from the battery cell.

It is further preferred that the method according to the present invention, further comprises: determining a stored sequence of charging-/discharging modes and corresponding sets of pre-defined desired temperatures or temperature gradients and pre-defined desired durations, for example as described above; determining whether an actual temperature gradient of the battery cell keeps a pre-defined desired temperature gradient for a first charging-/discharging mode of the determined sequence of charging-/discharging modes for an actual time period longer than the corresponding pre-defined duration; and automatically moving to the next charging-/discharging mode of the determined sequence of charging-/discharging modes, if the actual time period is longer than the pre-defined duration.

A current flowing in the battery module during operation may heat up elements other than the battery cells (e.g. metal plates connecting the battery cells) and therefore may lead to a difference between the measured battery module temperature and the actual battery cell temperature. It is therefore preferred to treat the measured battery module temperature with a weight function depending on an actual current flowing in the battery module before passing it as input value to the thermal battery cell model differential equation. If the current temperature T reaches the predefined temperature Ts, corresponding to a maximum temperature which is allowable for the battery cells/battery module, the maximum current allowed for charging or discharging the battery cell/module can be calculated according to the following equation:

$$m^*cp^*(dT/dt)=Q\text{dot}-\alpha i^*Ai^*(T-Ti) \quad \text{Equation 1}$$

wherein m represents the mass of the battery cell, cp represents the specific heat capacity of the battery cell, Qdot represents the heat loss, $\alpha i$ represents the heat transfer coefficient of a battery cell side, Ai represents the surface area size of a battery cell side and Ti represents the temperature of a battery cell side depending on the temperature of the adjacent medium.

In order to estimate the maximum current Imax dT=Ts−T and dt=Δt results in:

$$m^*cp^*(Ts-T)/\Delta t=Q\text{dot}-\alpha i^*Ai^*(T-Ti);$$

wherein Δt is the duration, after which the maximum Temperature Ts is reached, if all other restrictions are constant. Considering $$Q\text{dot}=I^2{}^*Ri,$$

Equation 1 can be solved in order to yield the maximum current Imax as follows:

$$I\text{max}=\text{sqrt}((((Ts-T)/\Delta t)^*m^*cp+\alpha i^*Ai(T-Ti))/Ri)$$

BRIEF DESCRIPTION OF THE DRAWINGS

Following is a detailed description of preferred embodiments of the present invention with reference to the accompanying drawings. In the drawings

DETAILED DESCRIPTION

Figure 1:
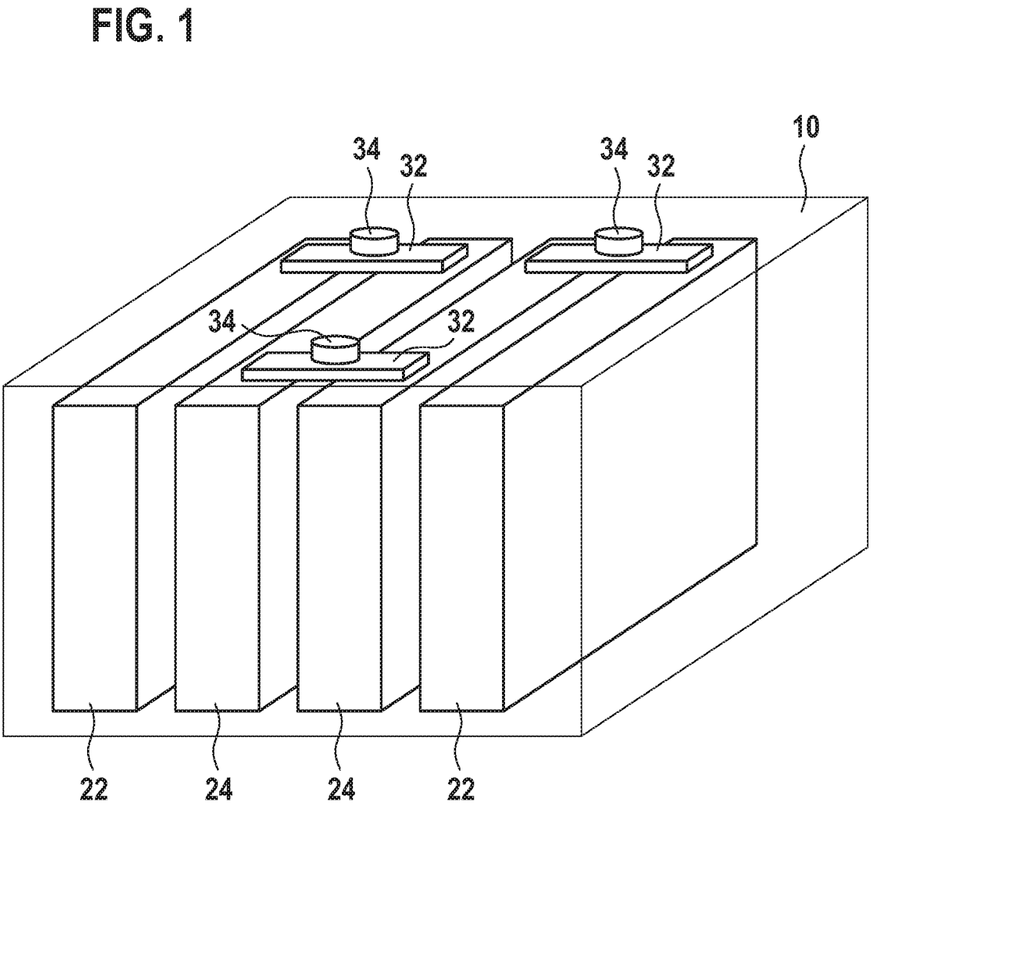
FIG. 1 is a diagram illustrating an exemplary configuration of a battery module according to prior art.

FIG. 1 is a diagram illustrating an exemplary configuration of a battery module 10 according to prior art. A plurality of battery cells 22, 24 is provided inside the battery module 10, wherein the battery cells 22 are located close to the side walls of the battery module 10, whereas the battery cells 24 are located towards the center of the battery module 10. The battery cells 22, 24 are connected to each other using battery cell connectors 32 made of a conductive material. A plurality of temperature sensors 34 is mounted on the battery cell connectors 32, such that a temperature of the respective battery cell connectors 32 may be measured. The temperature sensors 34 are each connected to an evaluation unit (not shown), which is configured to determine a temperature of the battery module 10 considering the temperature values of each of the temperature sensors 34.

In conventional implementations of battery modules it is assumed that temperatures of the individual battery cells only differ little from each other and that temperatures of the individual battery cells are all close to a determined temperature of the entire battery module. However, this assumption is not considering the fact that battery cells 22, 24 at different locations inside the battery module 10 may be exchanging heat with their respective different environment at different rates. For example, a battery cell 22, which is located close to an outer side wall of the battery module 10, may be able to dissipate heat more efficiently to a cooling environment around the battery module 10 compared to a battery cell 24, which is located toward the center of the battery module 10.

In addition, mounting the temperature sensors 34 on top of the battery cell connectors 32 may lead to temperature values which are different from the actual temperatures of the battery cells 22, 24 due to the fact that different amounts of current flowing through the battery cell connectors 32 may result in varying self-heating of the battery cell connectors.

Also for example aging effects which may have progressed to different levels for each individual battery cell may have an impact on temperature characteristics of the different battery cells therefore contributing to differences in battery cell temperatures or temperature gradients during operation of the battery module.

In contrast to state of the art battery modules the method and the device for controlling a temperature or a temperature gradient of a battery cell according to embodiments of the present invention determines the temperature for each individual battery cell depending on its individual parameters.

Figure 2:
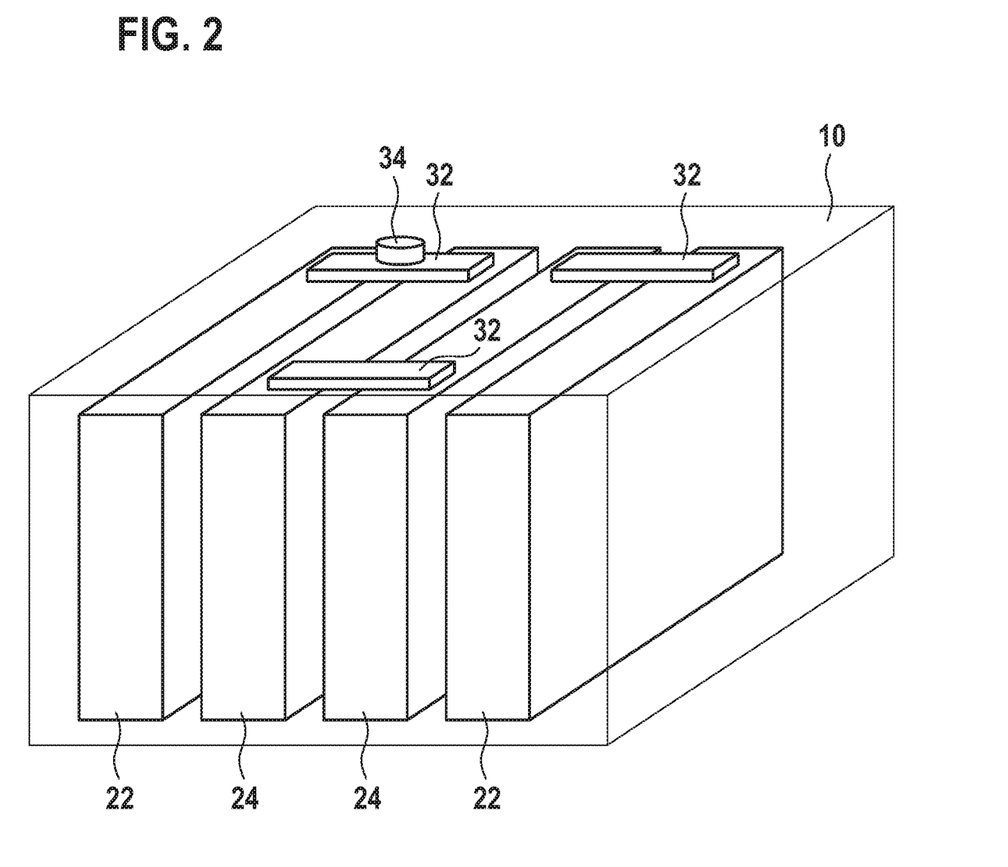
FIG. 2 is a diagram illustrating a configuration of a battery module according to a preferred embodiment of the present invention.

FIG. 2 is a diagram illustrating a configuration of a battery module 20 according to a preferred embodiment of the present invention. The battery module 20 uses the same configuration as that of the battery module 10 according to prior art, as shown in FIG. 2, except that the battery module 20 contains only one temperature sensor 34 instead of multiple temperature sensors.

Figure 3:
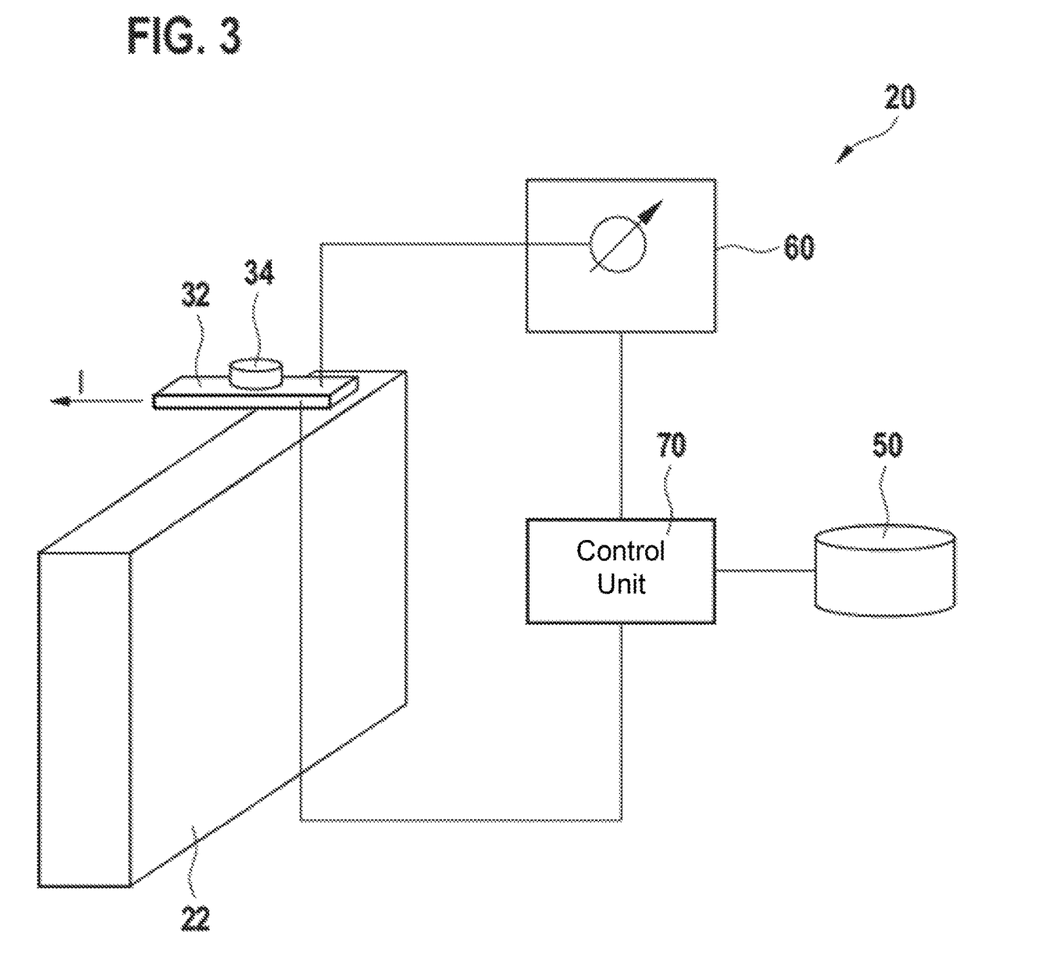
FIG. 3 is a diagram illustrating a portion of a configuration of a battery module according to a preferred embodiment of the present invention.

FIG. 3 is a diagram illustrating a portion of a configuration of a battery module 20 according to a preferred embodiment of the present invention. In addition to the components mentioned above the battery module 20 according to a preferred embodiment contains a memory device 50, a sensor unit 60 and a control unit 70. The sensor unit 60 is connected to the battery cells 22, 24 in such a way, that it is capable of measuring a current I which flows into or out of the respective battery cell 22, 24. The memory device 50 can for example store a maximum allowable temperature gradient, a model reflecting a variation of shape of the cells and/or a housing depending on thermal stress and/or a temperature gradient. Alternatively or additionally, corresponding information on the materials of the battery cell and/or the battery module are stored. Alternatively or additionally, a predefined admissible deformation can be stored in order to ensure that the corresponding admissible thermal stress is not exceeded. It goes without saying that the admissible thermal stress may alternatively be stored in the data storage without a definition of the predefined admissible deformation.

Figure 4:
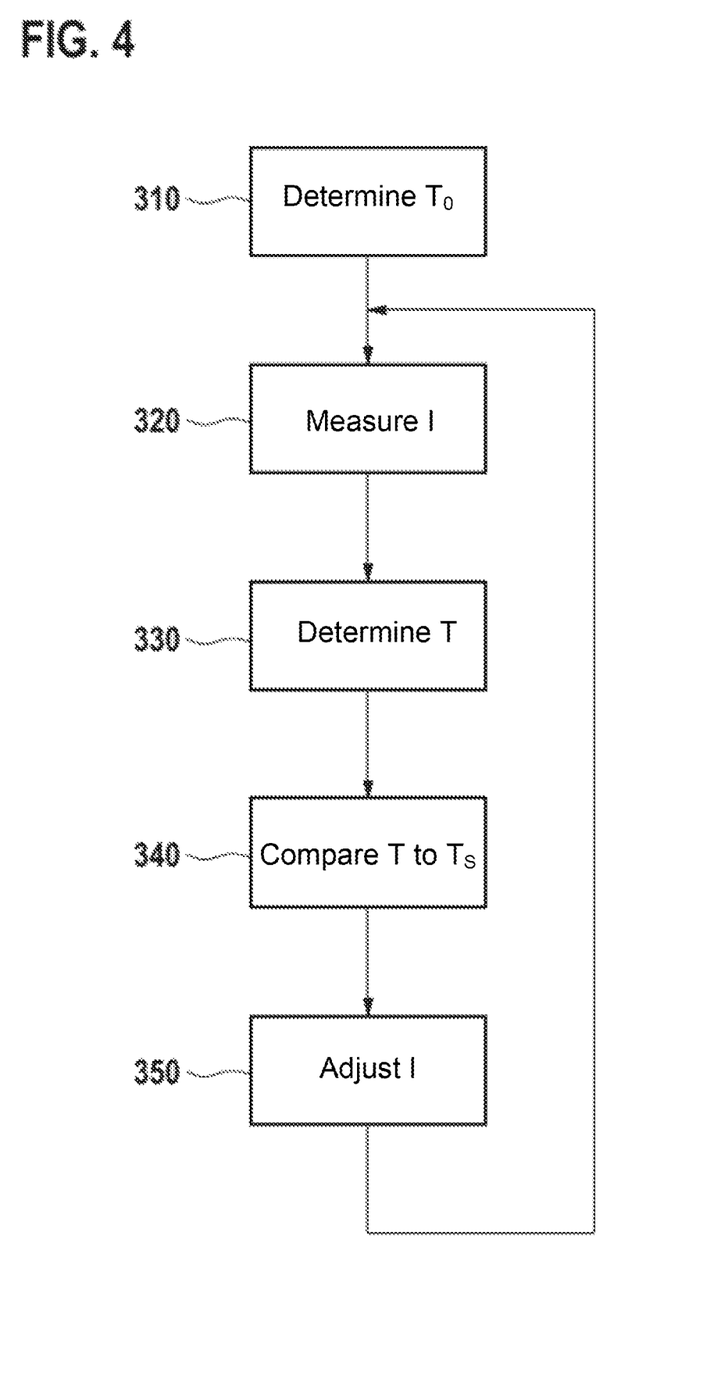
FIG. 4 is a flow diagram illustrating the method for controlling a temperature gradient in a battery cell according to a one embodiment of the present invention.

FIG. 4 is a flow diagram illustrating a method for controlling a temperature and/or a temperature gradient in a battery cell according to a preferred embodiment of the present invention.

In step 310 of FIG. 4 an initial temperature $T_0$ for each the of the battery cells 22, 24 contained in the battery module 20 is determined. In a preferred embodiment the initial temperature $T_0$ may be obtained at a point in time when the temperature or temperature gradient of each of the battery cells 22, 24 may be the same temperature or temperature gradient, respectively, and may be or correspond to the temperature measured by the one temperature sensor 34. The point in time for measuring the initial temperature may be for example an idle state of a system in which the battery module is used. This idle state may be defined for example by a pre-defined minimum period of time that needs to have passed without the system entering another operational state. Although the battery module may contain several temperature sensors, one temperature sensor may be sufficient for the method according to the present invention and may accordingly save cost.

In step 320 of FIG. 4 an actual current I which is flowing into or out of the battery cell 22, 24 is measured by means of the sensor unit 60.

In step 330 of FIG. 4 an actual temperature T of the battery cell 22, 24 is determined using a thermal battery cell model described by a differential equation, for which input values comprise at least the determined initial temperature $T_0$ and the actual measured current I. Other input values to the differential equation may comprise battery cell parameters, which are fixed values such as surface areas Ai for the different sides of the battery cell 22, 24 and/or heat transfer coefficients αi for the surfaces of the different sides of the battery cell 22, 24 and/or a mass m and/or a specific heat capacity cp of the battery cell 22, 24. Such fixed input values to the differential equation may be stored in the memory device 50 of the battery module 20.

Further input values to the differential equation may be variable values such as an actual battery module temperature Tb measured by the temperature sensor 34 inside the battery module 20 and/or an actual ambient temperature Ta in an environment around the battery module 20 measured by an external temperature sensor (not shown). In embodiments which use a coolant inside the battery module around the battery cells, an actual temperature of the coolant may be used as a further variable input to the differential equation of the thermal battery cell model.

The differential equation may look like Equation 1 above.

The temperatures Ti of all battery cell sides depend on the structure of the battery cell and may be equal to one or more of the air temperature around the battery cell, the temperature of the adjacent battery cell or in case a coolant is used inside the battery module the temperature of the coolant. The thermal dissipation loss may be determined by the correlation to $Ri*I^2$ for the battery cell, wherein Ri denotes an internal resistance value for the battery cell.

In step 340 the determined actual temperature T of the battery cell 22, 24 is compared with a pre-defined desired temperature Ts. The pre-defined desired temperature Ts may be for example a maximum temperature at which the battery cell 22, 24 is supposed to be operated but which is not to be exceeded. In other cases the pre-defined desired temperature Ts may be a minimum temperature which is to be reached within a certain time period, for example to get to a high performance output of the battery cell 22, 24 quickly.

In step 350 the current I flowing into or out of the battery cell 22, 24 is automatically adjusted according to the result of the comparison of step 340. For example, if the determined temperature T of the battery cell is higher than a pre-defined desired temperature Ts, which may represent a maximum temperature limit, the current I may be reduced, such that the actual battery cell temperature T decreases and reaches the pre-defined desired temperature Ts after some time. If the actual temperature T of the battery cell is lower than the pre-defined desired temperature Ts, which may for example represent a desired operating temperature, the current I may be increased until the actual battery cell temperature T increases to the value of the pre-defined desired temperature Ts, thus getting a higher power value from the battery cell. For these cases the target current I may be calculated by re-arranging Equation 1 described above (using Qdot=Ri*I²).

After automatically adjusting the current I flowing into or out of the battery cell in step 350 the method may proceed by going back to measuring the actual current in step 320.

As it is usually rather difficult to meet an exact temperature value for a battery cell 22, 24 by an adjustment of the current I flowing, it may be sufficient to reach a battery cell temperature value which lies close to the desired temperature within a certain range.

Figure 5:
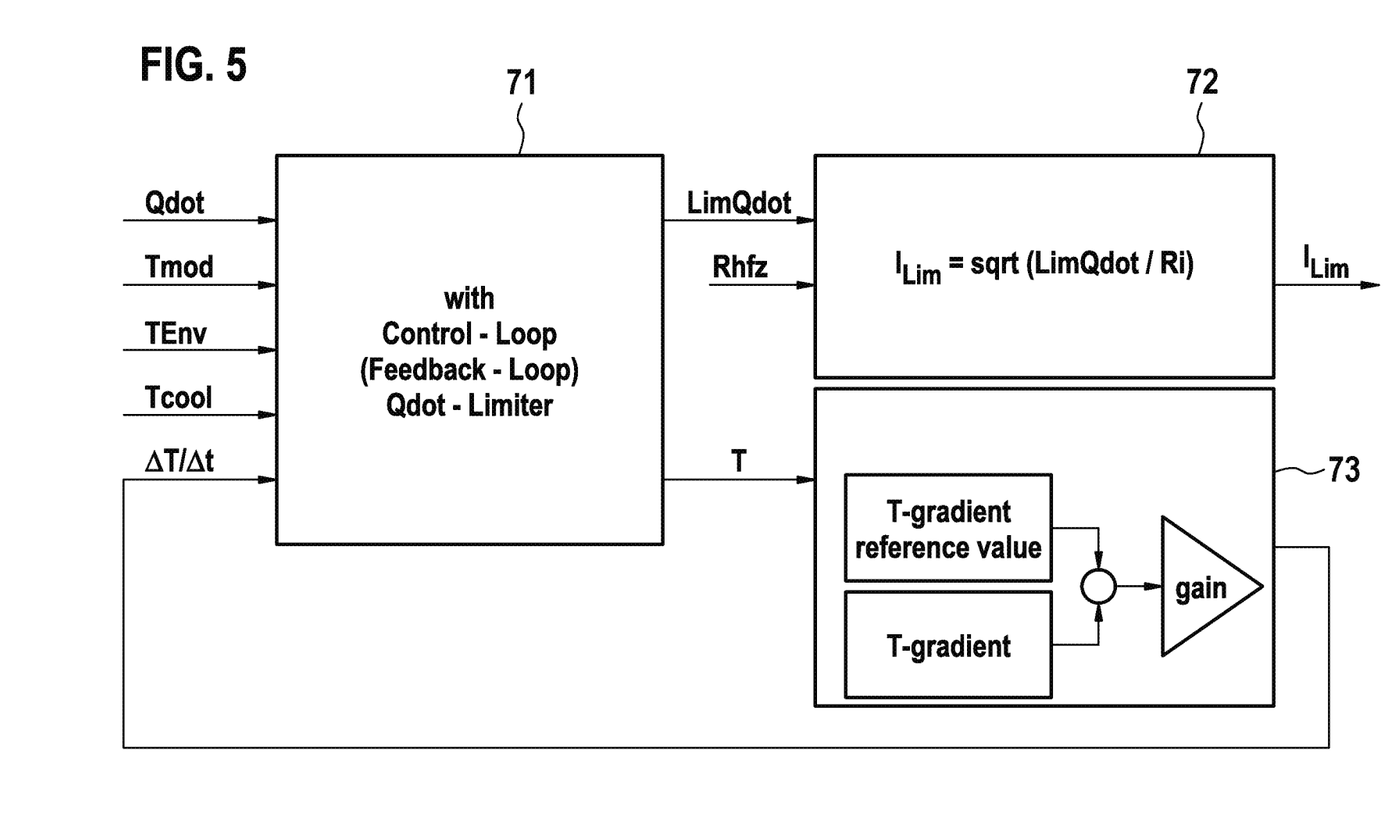
FIG. 5 is a flow diagram illustrating the method for controlling a temperature gradient in a battery cell according to a preferred embodiment of the present invention.

FIG. 5 shows a flow diagram in which a temperature gradient reference value is compared to a temperature gradient determined e.g. by means of the above differential equation and/or by measurement by a temperature sensor.

Three functional blocks 71, 72, 73 representing functions of the control unit (reference sign 70 in FIG. 3) are shown in order to elucidate the operations in connection with the temperature gradient estimation in connection with a thermal battery cell model according to the present invention. A temperature estimator T-estimator 71 comprises a control loop ("feedback loop") and operates as a Qdot-limiter. Qdot represents the change in heat comprised in the present battery cell. The T-estimator 71 receives information about Qdot, Tmod, TEnv and Tcool. Therein, Qdot represents the heating loss of the battery, Tmod represents the estimated cell temperature, TEnv represents the environment temperature and Tcool represents the coolant temperature of the terminal management. The TEnv and Tcool are measured temperatures with sensors, wherein Qdot and Tmod are calculated/modeled values. Rhfz represents Ri (Rhfz can be replaced by Ri). The T-estimator 71 itself comprises information about the regarded battery cell and/or the battery module e.g. by means of a thermal battery cell model described by a differential equation. In other words, the T-estimator 71 is adapted for calculating based on the received information a maximum change in heat LimQdot and pass same to a maximum current ILim calculator 72 as well as a current battery cell temperature T and pass same to a temperature gradient control block 73. Maximum current ILim calculator 72 further receives a reference value Rhfz representing the resistance Ri. Based on this information the maximum current ILim calculator 72 calculates a maximum current allowed for the battery cell or battery module in order to limit the change in heat based on the following equation:

$$ILim = \mathrm{sqrt}(LimQdot/Ri)$$

As a result, maximum current ILim calculator 72 outputs a value ILim, by which signal the charge/discharge of the battery cell/battery module can be controlled in order not to exceed the maximum temperature and/or a maximum temperature change/temperature gradient. On the other hand, temperature gradient control block 73 receives an estimated cell temperature T of T-estimator 71. Temperature gradient control block 73 is capable of calculating a current temperature gradient T-gradient and comparing same to a temperature gradient reference value T-gradient reference value. A difference of both values is fed to an amplifier denoted gain, an output of which is fed back to T-estimator 71 (data input ΔT/Δt). Accordingly, temperature gradient control block 73 provides a differential value for the temperature change over time. Based on the temperature gradient ΔT/Δt the maximum possible electrical heat generation LimQdot can be estimated by means of the differential equation $$(m*cp*(dT/dt) = Qdot - \alpha i * Ai(T - Ti)).$$

The maximum current for satisfying the predefined temperature gradient can be estimated by means of the following equation:

$$I_{Lim} = \mathrm{sqrt}(LimQdot/Ri).$$

The maximum allowable temperature gradient ΔT/Δt can be estimated for example from the calculated cell temperature T and the maximum allowable temperature Tmax.

In some embodiments of the present invention a pre-defined desired temperature for a battery cell 22, 24 to be operated at may depend on a specific charge-/discharge mode in which the battery cell 22, 24 is used. Therefore the memory device 50 may be configured to store data sets of operating modes (i.e. charge-/discharge modes) and corresponding pre-defined desired battery cell temperatures. For such cases the method according to the present invention may also comprise a step (not shown) of determining an actual operating mode of the battery cell 22, 24 and automatically determine an associated pre-defined desired battery cell temperature, for example by means of reading from the memory device 50.

In some embodiments of the present invention the battery cell may be supposed to operate following a sequence of different charging-/discharging modes. Therefore the memory device 50 may be configured to store data sets of charging-/discharging modes and their corresponding pre-defined desired battery cell temperatures and their corresponding durations (means for how long a battery cell should be operated in a respective charging-/discharging mode) for sequences of different charging-/discharging modes.

In addition to the detailed description of the disclosed invention described above it should be noted that for further disclosure of the present invention the accompanying drawings in FIG. 1 to FIG. 4 are to be taken into consideration.

The invention claimed is:

1. A method for controlling a temperature of a battery cell (22, 24) in a battery module (20), the method comprising the steps of:
    determining an initial temperature of the battery cell (22, 24);
    measuring a current (I) flowing into or out of the battery cell (22, 24);
    determining an actual temperature gradient of the battery cell (22, 24) using a thermal battery cell model described by a differential equation, for which input values comprise at least the determined initial temperature and the measured current (I), wherein the thermal battery cell model further comprises mechanical information from which a thermal stress resistance of the battery cell (22, 24) or the battery module (20) in connection with an actual temperature gradient is derived;
    comparing the determined actual temperature gradient of the battery cell (22, 24) with a pre-defined desired temperature gradient;
    automatically adjusting the current (I) flowing into or out of the battery cell (22, 24) according to a result of the comparison; and
    using a predefined admissible deformation in order to ensure that the corresponding admissible thermal stress is not exceeded.

2. The method according to claim 1, wherein the initial temperature is determined by means of a temperature sensor (34) in the battery module (20) at a pre-defined point in time or under a predefined condition.

3. The method according to claim 2, further comprising:
determining from the measured current (I), whether the battery cell is in an idle state;
measuring the amount of time for which the battery cell remains in the idle state; and
determining, after a pre-defined amount of time has passed with the battery cell remaining in the idle state, that the battery cell has reached the point in time or the pre-defined condition to allow measuring the initial temperature for each of the battery cells.

4. The method according to claim 1, further comprising:
determining that the actual temperature gradient for each of the battery cells (22, 24) is within a predefined range.

5. The method according to claim 1, wherein the thermal battery cell model comprises:
surface areas for the different sides of the battery cell (22, 24); or
heat transfer coefficients for the surfaces of the different sides of the battery cell (22, 24);
or
a mass and a specific heat capacity of the battery cell (22, 24)
as fixed input values for the differential equation of the thermal battery cell model.

6. The method according to claim 1, further comprising:
measuring by means of a temperature sensor (34) in the battery module (10) a battery module temperature; or
measuring by means of an external temperature sensor (46) an ambient temperature around the battery module (20) as variable input values for the differential equation of the thermal battery cell model.

7. The method according to claim 1 further comprising:
determining a charging-/discharging mode of the battery cell (22, 24); and
determining the pre-defined desired temperature gradient during the determined charging-/discharging mode.

8. The method according to claim 1, further comprising:
storing of data sets for sequences of charging-/discharging modes or corresponding pre-defined desired temperatures or corresponding pre-defined desired durations, for which a certain stored temperature value is to be maintained in the corresponding charging-/discharging mode.

9. The method according to claim 1 further comprising:
determining a stored sequence of charging-/discharging modes and corresponding sets of pre-defined desired temperatures and pre-defined desired durations;
determining whether an actual temperature gradient of the battery cell (22, 24) keeps a pre-defined desired temperature gradient for a first charging-/discharging mode of the determined sequence of charging-/discharging modes for an actual time period longer than the corresponding pre-defined duration; and
automatically proceeding to the next charging-/discharging mode of the determined sequence of charging-/discharging modes, if the actual time period is longer than the pre-defined duration.

10. The method according to claim 6 further comprising:
adjusting the measured battery module temperature to be used with the thermal battery cell model by a weight factor depending on the measured current (I) flowing into or out of the battery cell.

11. The method according to claim 1, further comprising:
determining that the actual temperature gradient for each of the battery cells (22, 24) is equal to the pre-defined desired temperature gradient.

12. A temperature controlling device of a battery cell (22, 24) in a battery module (20), wherein the device comprises:
a memory device (50) for storing a pre-defined thermal battery cell model defined by a differential equation, and fixed input values of the battery cell (22, 24) for the thermal battery cell model, wherein the thermal battery cell model further comprises mechanical information from which a thermal stress resistance of the battery cell (22, 24) or the battery module (20) in connection with an actual temperature gradient is derived;
a sensor unit (60) for determining variable input values for the thermal battery cell model; and
a control unit (70), wherein
the sensor unit (60) is configured to at least measure a current (I) flowing into or out of the battery cell (22, 24)
the control unit (70) is configured
to determine an actual temperature gradient of the battery cell using the stored thermal battery cell model,
to compare the determined temperature gradient with a pre-defined desired temperature gradient,
to automatically adjust a current (I) flowing into or out of the battery cell (22, 24) based on this comparison result, and
to use a predefined admissible deformation in order to ensure that the corresponding admissible thermal stress is not exceeded.

* * * * *